United States Patent [19]

Spiess et al.

[11] 4,352,672
[45] Oct. 5, 1982

[54] PROCESS FOR THE PRODUCTION OF COLORFUL AND FIGURATIVE DESIGNS OF SHAPED SYNTHETIC-RESIN ARTICLES

[75] Inventors: Karl-Heinz Spiess, Much-Schwellenbach; Harald Stock, Königswinter, both of Fed. Rep. of Germany

[73] Assignee: Dynamit Nobel Aktiengesellschaft, Troisdorf, Fed. Rep. of Germany

[21] Appl. No.: 236,935

[22] Filed: Feb. 23, 1981

[30] Foreign Application Priority Data

Feb. 22, 1980 [DE] Fed. Rep. of Germany ....... 3006604

[51] Int. Cl.³ .............................................. D06P 5/20
[52] U.S. Cl. ....................................... 8/444; 430/332
[58] Field of Search .......................... 8/444; 430/332

[56] References Cited

U.S. PATENT DOCUMENTS

| | | | |
|---|---|---|---|
| 3,056,673 | 10/1962 | Wainer | 430/332 |
| 3,306,748 | 2/1967 | Chalkley | 430/332 |
| 3,386,829 | 4/1968 | Newland | 430/332 |
| 3,517,192 | 6/1970 | Kinoshita et al. | 8/444 |
| 3,957,513 | 5/1976 | Kobayashi et al. | 430/332 |
| 4,001,587 | 1/1977 | Panchenkov et al. | 250/474 |
| 4,029,506 | 6/1977 | Dessauer | 430/332 |

FOREIGN PATENT DOCUMENTS

| | | | |
|---|---|---|---|
| 45-1948 | 1/1970 | Japan | 8/444 |
| 46-39513 | 11/1971 | Japan | 8/444 |
| 999480 | 7/1965 | United Kingdom | 8/444 |

Primary Examiner—Maria Parrish Tungol
Attorney, Agent, or Firm—Antonelli, Terry & Wands

[57] ABSTRACT

A process for the production of colorful and figurative designs of shaped synthetic-resin articles with the use of colorants, involves the step of coloring a shaped article formed of a synthetic resin at least partially with a colorant that changes color by being exposed to ionizing rays and the step of exposing the article to ionizing rays in selected zones corresponding to the figurative design until color changes are achieved.

17 Claims, 5 Drawing Figures

PROCESS FOR THE PRODUCTION OF COLORFUL AND FIGURATIVE DESIGNS OF SHAPED SYNTHETIC-RESIN ARTICLES

A number of processes have been known for the production of plain-colored or multicolored, patterned shaped articles made of a synthetic resin, wherein the designs obtained depend, in each case, on the process techniques employed to manufacture the synthetic-resin article. For example, it is known to produce patterned panels by extrusion. As described, for instance, in DOS [German Unexamined Laid-Open Application] No. 2,534,724, the thus-obtainable products are either multilayered panels with two or more planar-parallel layers of different colors, or continuously structured materials with one or several colors or longitudinally oriented patterns. Continuous patterns with a uniform, random structure or a unidirectional structure are also possible, for example, according to the so-called "block method" as described, for example, in DAS [German Published Application] No. 1,479,090, but this process involves high manufacturing costs due to the many production stages.

It is also known to manufacture flat synthetic-resin articles, for example floor coverings, according to a calendering method to provide a multicolored, continuous marbling-effect. However, in this process the marbled structure is aligned with the longitudinal orientation brought about by the required calendering process and cannot be modified to obtain any desired design by alteration of the process in a corresponding way. Moreover, it is known to impart any desired design to shaped articles, such as sheets, films, or panels of a synthetic resin by imprinting the surface. However, in the printing method the abrasion resistance of the colors imprinted on the synthetic resin surface is low, since the dye application is only very thin, and the dyes cannot penetrate into the synthetic resin material to a sufficient depth. Therefore, in many cases a transparent cover layer is applied over the printed pattern when using the printing technique, in order to obtain a longer useful life and to protect the printing dye against abrasion. In such products, the useful life is determined by the thickness of the transparent cover layer, since after the cover layer has been abraded destruction of the printed-on pattern begins in turn.

The conventional methods for the production of plain- or multi-colored designs for flat synthetic resin articles thus are either limited by the required processing technique, for example calendering, extrusion, etc. with respect to the design possibilities, or entail, when allowing a free choice of patterning, as for example in the printing technique, a restriction of the desired physical and mechanical properties, since the pattern is only provided in a minor thickness corresponding to the dye application. The factor of minor thickness is very disadvantageous, especially in case of products which are subject to strong wear effects during the course of usage with respect to the patterned surface, for example floor coverings, toy balls, etc.

It is furthermore known that, due to the effect of high-energy, ionizing radiation, changes occur in especially organic dyes, which manifest themselves in a color change of the dye. This fact has been exploited for the production of dosimeters for ionizing rays; in this connection, attention is invited, for example, to U.S. Pat. No. 4,001,587. Normally, these dye dosimeters for ionizing rays are utilized for the measurement of large does of radiations, since normally the color changes in irradiated dyes occur only with the use of relatively high radiation doses. In connection with synthetic resins, it is to be noted that the doses of irradiation normally employed in dye dosimetry are already strong enough to greatly alter the mechanical properties of synthetic resins, in particular. In this connection, attention is invited to the book by B. Dolezel, "Die Bestaendigkeit von Kunststoffen und Gummi" [The Stability of Synthetic Resins and Elastomers], Carl Hanser Publishers (1978), the chapter on stability with respect to ionizing radiation, pp. 303–336.

The use of ionizing radiation, especially electron rays, for technical use has thus far been developed only for a few areas, for example in the curing of varnish by means of electron rays, for the crosslinking of synthetic resins, e.g. in the elastomer industry, for the sterilization in the medical sector, in the grocery industry for the destruction of mold and yeast spores, and in the textile industry for rendering fabrics crease-resistant.

This invention is concerned with the problem of providing a process for the production of colorful and figurative designs for shaped articles made of a synthetic resin by using dyes, the process making it possible to create, in dyed shaped articles, continuous or partially continuous, colorful and figurative designs in a reproducible fashion and independently of the manufacturing procedure used for the shaped synthetic resin articles.

The invention shows a way for utilizing the actually known behavior of colorants, i.e. dyes, dyestuffs and/or pigments, and synthetic resins under the effect of ionizing radiation in order to solve the posed problem in a surprising and successful fashion. According to the invention, the shaped articles are at least partially colored with colorants changeable by ionizing radiation, and are then exposed to ionizing radiation in selected areas corresponding to the figurative design until the appropriate color changes are achieved.

It is possible by means of the invention to manufacture in molded extruded and the like shaped synthetic resin components flat as well as three-dimensional designs in a defined and reproducible manner. With this invention, it is possible to provide a pattern in prefabricated shaped articles, e.g. sheets, panels, and films which are calendered or extruded or spread-coated or laminated, which are single-layered or multilayered, injection-molded components, continuously or partially dyed molded components, optionally with transparent or opaque regions.

Changeable colorants, i.e. colorants having colors that are changed by ionizing radiation, suggested for this invention are, in particular, organic dyes and/or organic pigments, such as, for example, the dyes which have proven themselves well in the coloring of synthetic resins, such as monoazo dyes, diazo dyes, anthraquinone dyes, metal-complex dyes, quinophthalone dyes, napththazin dyes, perinone dyes, pyrazolone dyes, coumarin dyes, thioindigo dyes, thioxanthene dyes, or organic pigments, such as diarylide pigments, pyrazolone pigments, disazo pigments, pigments of $\beta$-hydroxynapthhoic acid, copper phthalocyanine pigments, pigments on the basis of the derivatives of naphthalene- or perylenetetracarboxylic acid, disazo condensation pigments, dioxazine pigments, quinacridone pigments, thioindigo pigments, or isoindolinone pigments.

In a further development of the invention, it is also possible to use, besides changeable colorants, those colorants particularly inorganic pigments, for coloring the shaped article which do not as yet change at the doses of ionizing radiation being utilized, i.e. those colorants which can be considered color-stable. In this way, the number of colors and patterns producible according to the method of this invention can be even further enlarged. In this connection, suitable are pigments such as titanium dioxide, zinc sulfide, iron oxide, chromium oxide, mixed-phase, cadmium and chromate pigments, for example. The amount (Concentration) of dye, dyestuff and/or pigments being applied to the synthetic resin is variable and depends f.i. on the kind of the used dye, dyestuffs and/or pigments, and on the desired colours and designs.

It has now been found according to the invention that the color change of a specific dye, dyestuff or pigment, i.e. a colorant, is dependent not only on the radiation dose, but also on the type of polymer and/or on the additives admixed with the synthetic resin. It has been found that the alterations of the colorants and thus the color changes are produced, on the one hand, by a chemical addition of free radicals in the shaped synthetic resin article, formed due to the ionizing radiation, to the colorants, and, on the other hand, by the rearrangement of side chains of the colorants proper or also by degradation of the colorants on account of the irradiation. An especially advantageous mode of operation according to this invention provides that the synthetic resins which release radicals at a low radiation dose be utilized for the production of the shaped articles. Thus, it has been discovered according to the invention that those polymers which release radicals at adequately low radiation doses, which radicals can then enter into an interaction with the colorants, will reduce the radiation does required for obtaining a color change in the colorants, and thus effect color changes at radiation doses which do not lead to any impairment of the concomitantly irradiated synthetic resins interfering with their subsequent usage. Thus, here the surprising effect is achieved that, by the selection of specific polymers having a specific behavior with respect to ionizing radiation, the radiation doses necessary for obtaining color changes of colorants by ionizing radiation are considerably reduced. In this way, it becomes possible to utilize, in particular, even those synthetic resins which exhibit only a moderate or average stability with respect to the ionizing radiation.

In dependence on the synthetic resins employed in a particular case for the shaped article, a radiation dose of 1-20 Mrad, preferably of between 1 and 8 Mrad, is utilized according to the invention.

Preferred synthetic resins for the use of the method of this invention are cellulose and the derivatives thereof, such as cellulose acetate, cellulose butyrate, cellulose propionate, as well as polyamides, rigid polyvinyl chloride, soft polyvinyl chloride, epoxy resins, polyolefins, elastomers, such as butyl rubber. As far as the expression "shaped articles of synthetic resins" is utilized in connection with this invention, this term also includes synthetic resin molding compositions, i.e. additives such as plasticizers, stabilizers, lubricants [mold-release agents], fillers and others. When selecting the additives, one must consider, in certain cases, these additives can change their properties due to radiation and may exert an influence perhaps on the color change of the colorants, or the additives can also have the effect of antiradiation agents, i.e. of increasing the stability of the synthetic resin. Synthetic resins exhibiting very great stability to ionizing radiation, such as, for example, an unmodified polycarbonate, are less suitable for use in the process of this invention, since high irradiation doses are required to bring about small color changes of the dyestuffs; this is so because no interaction with the dye can occur due to the radiation-resistant polycarbonate. However, it is possible to render highly radiation-resistant synthetic resins suitable for use according to the invention by adding less radiation-resistant additives; in other words, here an interaction with respect to the colorant is obtained via irradiation and chemical change of the additives, which can lead to a color change of the dyes at low radiation doses. However, it is also possible to utilize colorants which are degraded by an adequate dose of radiation and produce the color change also in this way.

The method of this invention can be executed in a particularly advantageous way with electron beams, since corresponding devices for the generation of electron beams are widely known. Figurative designs of the shaped articles according to the process of this invention are possible in various ways. One advantageous version of the invention provides that the shaped articles are covered during irradiation with ionizing rays partially with materials that absorb or reflect the ionizing radiation. These materials can be advantageously constructed as templates with perforations for the figurative design, for example lead templates or aluminum templates. In the shielded zones, the original colors of the colorants are thus obtained on the surface and in the shaped article during irradiation; whereas in the irradiated regions a corresponding color change takes place in accordance with the radiation dose and in dependence on the colorant employed.

According to a further proposal of the invention, it is possible to alter the penetration depth of the ionizing rays into the shaped article by varying the acceleration voltage for the ionizing rays while passing the shaped article through an irradiation zone, so that over the thickness of the shaped article figuratively defined, varying color regions are produced, for example wedges of color.

A further possibility to obtain figurative designs resides, according to the invention, in varying the intensity of the ionizing rays (beam current strength) over the irradiated surface of the shaped article so that correspondingly figuratively defined, varying color regions are formed on the surface of the shaped article. It is also possible to combine the various possibilities discussed herein for obtaining figurative patterns with one another.

The process of this invention is explained in greater detail with reference to examples shown in the drawing, wherein.

Figure 1:
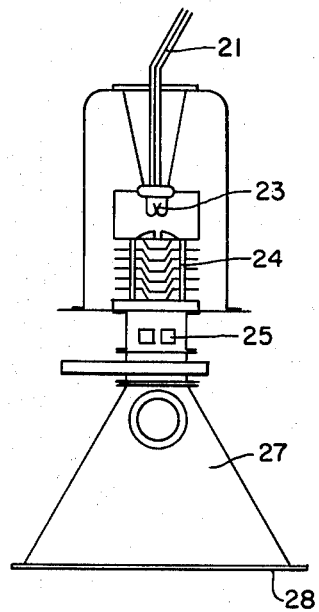
FIG. 1 shows schematically the construction of an electron accelerator.

FIG. 1 shows an electron accelerator 20 usable as the energy source for triggering the chemical reactions in the shaped article; this accelerator emits free electrons. These electrons are produced by the thermionic cathode 23 by the application of a correspondingly high acceleration voltage 21, for example 1.5 MeV, and scattered by means of subsequent acceleration and deflection systems 24, 25 into the desired curtain of radiation in the scanner 27; the electrons leave the scanner at the scanner window 28. In this connection, the electrical energy provided by the high-voltage rectifier, namely the acceleration voltage, is converted practically entirely into radiant energy. The energy of the electrons is measured by the unit of electron volt, eV. The information that an electron beam has an energy of 300 keV means that the electrons have passed through an electric field with a total voltage of 300 kV, wherein each individual particle received an amount of kinetic energy of 300 keV. The yield of the radiation-chemical reaction in the irradiated shaped article depends on the number of electrons impinging on the layer during the irradiation period, i.e. on the intensity of the electron beam (beam current strength), which is measured in amperes. The radiation power is the product of acceleration voltage and beam current strength, indicated in kw. The energy absorbed during irradiation in one gram of the material and available for initiating the chemical reaction in the material is called the radiation dose. The radiation dose is measured in rad or Mrad, wherein one rad means an absorbed energy of 100 erg/g. An additional factor of significance in determining the radiation data is the penetration depth of the radiation, e.g. electrons, into the irradiated material.

Figure 2:
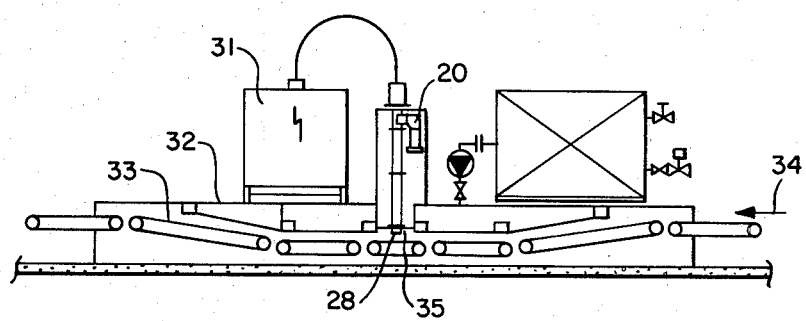
FIG. 2 shows schematically an electron beam unit for conducting the process of this invention.

FIG. 2 illustrates schematically an electron beam unit for conducting the process of this invention. This unit consists essentially of the electron accelerator 20, of the conveying system 33 on which the shaped articles to be irradiated are transported in the direction of arrow 34, of the irradiation channel 35, shielded by a reinforced concrete bunker 32, of the high-voltage unit 31 for the electron accelerator 20. The spacing between the scanner window 28 and the shaped articles, lying on the conveyor belt 33 and transported thereby, is adjustable.

The following examples relate to shaped articles provided with designs by means of irradiation according to this invention.

EXAMPLE 1

A panel having a thickness of 8 mm, dyed throughout, was extruded as a shaped article from cellulose diacetate (54% acetic acid, 26% diethyl phthalate plasticizer), dyed with 0.02% "Solvaperm Green" G, an antraquinone dye by Hoechst AG. According to FIG. 3, the lead template 2 having a thickness of 1 mm is placed on this panel 1, and the panel, together with the lead template 2, is exposed to an electron beam treatment in a unit according to FIG. 2 for the production of a colored and figurative pattern. With an acceleration voltage of 3.25 MeV, a beam current strength of 2.4 mA, a feed of 1.4 m/min (travel velocity of the panel past the scanner window), the panel is exposed to a radiation dose of 4 Mrad.

After the radiation treatment, the panel 1 still exhibits, in the shielded zone underneath the lead template 2, the original green shade of "Solvaperm Green" G, as the original dyed-in color; whereas the uncovered regions of the panel 1, exposed to the radiation, have experienced a color change and now show a reddish-blue color shade.

EXAMPLE 2

A shaped article is produced by extrusion from four layers of cellulose acetate having the formulation as indicated in Example 1, with the layers arranged in parallel superposition. The layers in a sequence 1 to 4 exhibit varying thicknesses in the sequence of 1.0+1.0+4.5+1.5 mm=8 mm, and are dyed as follows:

| | |
|---|---|
| Layer 1 with 0.01% | "Solvaperm Green" G |
| Layer 2 with 0.3% | "Rich Red" HRR, a disazo dye from Hoechst AG |
| Layer 3 with 0.015% | "Neozapon Black" RE, a dye from BASF AG |
| Layer 4 with 0.01% | "Solvaperm Red Violet" R, an anthraquinone dye from Hoechst AG |

Figure 3:
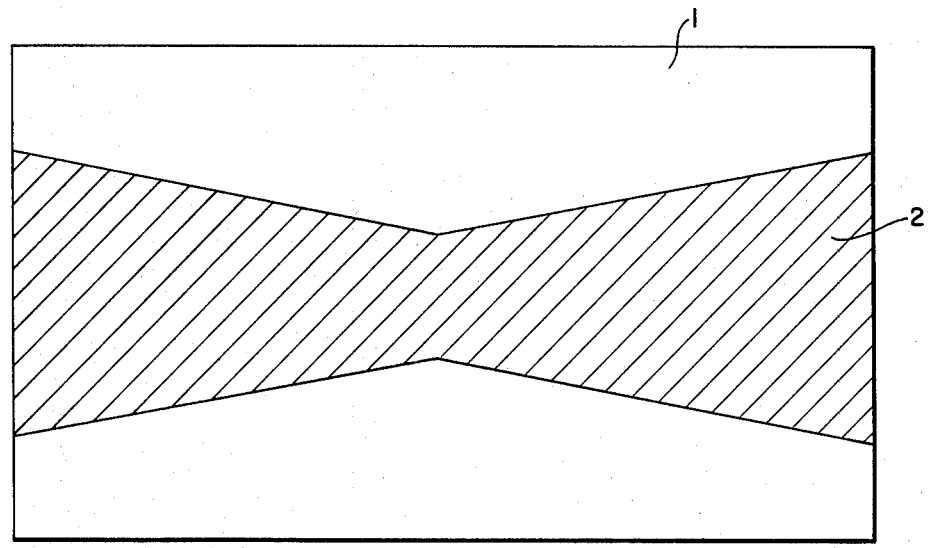
FIGS. 3 and 4 show templates for placing onto the shaped articles to be irradiated.

The four-layered panel 1, manufactured by extrusion, is again covered with a template as illustrated in FIG. 3 and exposed to electron beam radiation. The radiation conditions are the same as in Example 1; the radiation dose is 4 Mrad. Due to irradiation, the colors in the unshielded zones of the panel are altered as follows:

Layer 1 from color shade green to bluish-red
Layer 2 from color shade red to gold;
Layer 3 from color shade bluish-red to brown
Layer 4 from color shade bluish-red to brown By the combination of the original colors with the color shades altered by the irradiation, interesting, optically pleasant mixed-color effects are obtained in addition to the figurative pattern.

EXAMPLE 3

Figure 5:
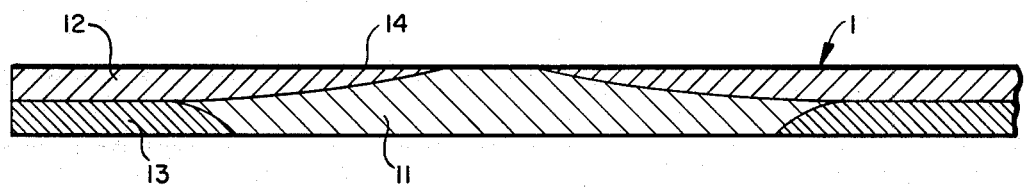
FIG. 5 shows a cross section through a multiple-layer, multicolored shaped article prior to irradiation.

The shaped article illustrated in cross section in FIG. 5 consists of a cellulose acetate panel dyed differently in 4 zones and is produced by extrusion (formulation for cellulose acetate corresponding to Example 1). The zones are dyed as follows:

| | |
|---|---|
| Zone 11 colorless | |
| Zone 12 0.03% | "Solvaperm Red Violet" R, an anthraquinone dye from Hoechst AG |
| Zone 13 0.01% | "Rich Red" HRR |
| Zone 14 0.015% | "Solvaperm Black" M, an anthraquinone dye from Hoechst AG |

Figure 4:
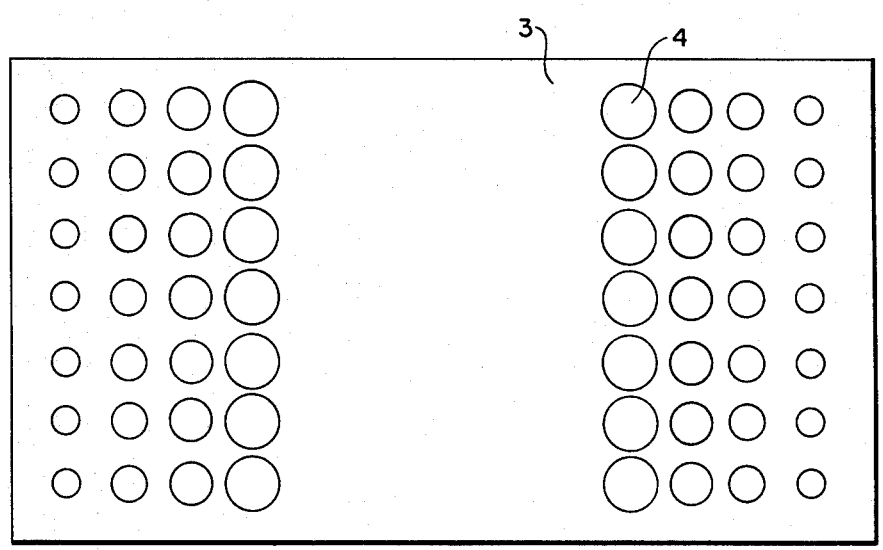

The panel 1 according to FIG. 5 is covered with a lead template according to FIG. 4, provided with holes 4 and having a thickness of 1 mm, and is irradiated on this side with electrons in a unit according to FIG. 2. The radiation dose is 4 Mrad, the other radiation data correspond to those of Example 1. After irradiation, the radiated zones show the following color changes:

Zone 11 unchanged colorless
Zone 12 from color shade bluish-red to brown
Zone 13 from color shade red to gold
Zone 14 from color shade blue to greenish-yellow The figurative and colored design attainable by the process of this invention can be reproduced at will and can be varied with correspondingly patterned templates. Moreover, the color changes can be varied by greater or lesser doses within a range wherein the synthetic resin of the shaped article is not damaged. It has furthermore been found that the color change becomes the more visible, the lower the dye concentration.

EXAMPLE 4

The shaped article is a soft PVC film of a soft PVC plastisol produced by spreading and gelling. The soft PVC plastisol has the following formulation:

| | |
|---|---|
| 40 | parts by weight of E-PVC, K-value 70 |
| 35 | parts by weight of bulk PVC, K-value 65 |
| 26 | parts by weight of dioctylphthalate plasticizer |
| 2 | parts by weight of epoxidized soybean oil |
| 1 | part by weight of barium/cadmium stabilizer |
| 0.1 | part by weight of "Ceres Blue" GN, an anthraquinone dye from Bayer AG |

The plastisol is spread onto a steel strip and gelled. Gelling time is 2.5 minutes at 200° C. with a thickness of about 1 mm.

The soft PVC film is irradiated with a feeding speed of 8 m/min in an electron beam unit according to FIG. 2. With an acceleration voltage of 800 keV, a beam current strength of 9 mA, the film is exposed to a radiation dose of 2 Mrad. It is now possible to change also the radiation dose, by varying the beam current strength, so that, in an appropriate alternation of beam current strengths, the color changes of the original dye of the soft PVC film are more or less strongly pronounced, and thus, in the selected original dye, "Ceres Blue" GN, continuously changing transitions are created from the original blue shades into the green shades by way of blue-green. In this way, the film, originally dyed in one single color, is provided with a multicolored pattern alternating between blue and green shades in the travel direction by the process of the invention.

EXAMPLE 5

A shaped article is created by compressing polyamide granules, dyed superficially with 0.02% of "Ceres Blue" GN, into a panel having a thickness of 2 mm at 200° C. This panel can be covered, in turn, by a template 2 or 3 corresponding to FIG. 3 or 4, and can be irradiated in an electron beam unit according to FIG. 2 with a radiation dose of 8 Mrad. After irradiation, the panel shows a substantially deeper, darker blue shade in the irradiated regions than in the zones having the original, blue shade and not having been irradiated. However, the process of this invention is not limited to the patterning of flat, planar components, but is also suitable for providing patterns in components and surfaces of any desired configuration. For example, strongly profiled surfaces can be patterned in various colors merely by the fact that the penetration depth of the electrons, and thus also the absorbed energy, are different.

What is claimed is:

1. A process for the production of colorful and figurative designs of shaped synthetic resin articles with the use of colorants which comprises coloring a shaped article formed of a synthetic resin at least partially with colorants that change color by being exposed to electron rays and then exposing the article to electron rays with a radiation dose of between 1 and 20 Mrad in selected zones corresponding to a figurative design until color changes are achieved; said article being covered in zones other than said selected zones with a material which absorbs or reflects the electron rays during exposure to said electron rays whereby the original colors of the colorants are maintained in the covered zones.

2. A process according to claim 1, wherein organic dyes, organic pigments on mixtures thereof are used as the changeable colorants.

3. A process according to one of claims 1 or 2, wherein the shaped articles are formed from at least one synthetic resin, containing an additive which releases radicals at a low radiation dose.

4. A process according to claim 3, wherein the synthetic resins used to form the shaped articles have an average resistance against the electron rays up to a radiation dose of not more than 10 Mrad, wherein only minor alterations of properties occur.

5. A process according to claim 1 or 2, wherein the at least one synthetic resin used for forming the shaped article comprises, cellulose acetate, cellulose butyrate or cellulose propionate.

6. A process according to claim 1 or 2, wherein polyamide is used to form the shaped article.

7. A process according to claim 1 or 2, wherein rigid polyvinyl chloride or soft polyvinyl chloride is utilized to form the shaped article.

8. A process according to claim 1 or 2, wherein an epoxy resin is utilized to form the shaped article.

9. A process according to claim 1 or 2, wherein a polyolefin is utilized to form the shaped article.

10. A process according to claim 9, wherein the polyolefin is polypropylene or polyethylene.

11. A process according to claim 1 or 2, wherein butyl rubber is utilized to form the shaped article.

12. A process according to claim 1 or claim 2, wherein the shaped article is exposed to a radiation dose of between 1 and 8 Mrad.

13. A process according to claim 1, wherein, as the material which absorbs or reflects electron rays, a template is utilized with perforations for figurative designing.

14. A process according to claim 13, wherein the template is made of lead or aluminum.

15. A process according to claim 1 or claim 2, wherein the penetration depth of the electron rays into the shaped article is varied by changing the acceleration voltage for the electron rays while passing the shaped article through an irradiation zone, so that over the thickness of the shaped article figuratively defined, varying color regions are produced.

16. A process according to claim 1 or claim 2, wherein the intensity of the electron rays in terms of beam current strength is varied over the irradiated surface of the shaped article, so that figuratively defined color regions are produced on the surface of the shaped article.

17. A process according to claim 1 or claim 2, wherein single-layer of multiple-layer shaped articles produced by calendering, extrusion, lamination, spread-coating, or injection-molding, which are colored throughout or in part and optionally exhibit transparent or opaque regions, are provided with patterns by said electron ray exposure.

* * * * *